United States Patent [19]

Ikeda et al.

[11] Patent Number: 5,777,955
[45] Date of Patent: Jul. 7, 1998

[54] SIGNAL PROCESSING CIRCUIT FOR AN OPTICAL DISK PLAYER INCLUDING DATA DECODING BASED ON A REGENERATED BIT CLOCK

[75] Inventors: Osamu Ikeda; Naobumi Nagasawa, both of Gunma; Tsutomu Ishikawa, Ota; Akira Tsukihashi, Gunma, all of Japan

[73] Assignee: Sanyo Electric Co., Ltd., Osaka, Japan

[21] Appl. No.: 670,797

[22] Filed: Jun. 21, 1996

Related U.S. Application Data

[63] Continuation of Ser. No. 271,837, Jul. 6, 1994, abandoned.

[30] Foreign Application Priority Data

Jul. 7, 1993 [JP] Japan .................. 5-167872

[51] Int. Cl.[6] .................................... G11B 17/22
[52] U.S. Cl. .................. 369/32; 369/124; 369/47
[58] Field of Search .................. 369/32, 124, 13,
369/54, 58, 59, 47, 1, 4, 50, 44.28, 44.26,
116, 48; 360/114, 59

[56] References Cited

U.S. PATENT DOCUMENTS

| | | | |
|---|---|---|---|
| 4,876,719 | 10/1989 | Nakagami et al. | 369/1 X |
| 5,060,208 | 10/1991 | Nagai et al. | 369/13 |
| 5,062,091 | 10/1991 | Maeda et al. | 369/13 |
| 5,086,421 | 2/1992 | Tateishi | 369/50 |
| 5,109,369 | 4/1992 | Maeda et al. | 369/50 |
| 5,260,800 | 11/1993 | Sturm et al. | 369/84 X |
| 5,315,571 | 5/1994 | Maeda et al. | 369/50 |
| 5,347,506 | 9/1994 | Matsudo et al. | 369/124 |
| 5,526,339 | 6/1996 | Shimada | 369/124 |

FOREIGN PATENT DOCUMENTS 485234  5/1992  European Pat. Off. .

OTHER PUBLICATIONS

Hideki Imai, et al., "Essentials of Error–Control Coding Techniques", Academic Press, Inc. Aug. 28, 1990.

*Primary Examiner*—Ali Neyzari
*Attorney, Agent, or Firm*—Loeb & Loeb LLP

[57] ABSTRACT

In a CD type disk player, main data in a digital signal, which is read from a CD type disk traced by a pickup, is decoded in a decoding means in accordance with a bit clock regenerated in a clock regenerator. Both the writing and reading of the data into and from a memory can be synchronized with the bit clock. Also, a selector can switch over the operation clock of the decoding means, thereby selecting the more important factor, either time base precision or decoding ability, in correspondence with the kind of disk. While avoiding the enlargement in size and power consumption of the disk motor, the read out of the information from the disk can be conducted at a higher speed.

8 Claims, 1 Drawing Sheet

SIGNAL PROCESSING CIRCUIT FOR AN OPTICAL DISK PLAYER INCLUDING DATA DECODING BASED ON A REGENERATED BIT CLOCK

This is a continuation of application Ser. No. 08/271,837, filed Jul. 6, 1994, now abandoned.

BACKGROUND OF THE INVENTION

1. Field of the Invention

This invention relates to a disk player which plays back a CD type disk and in particular to a disk player which can reproduce main data recorded on a CD-ROM disk at high speed.

2. Description of the Related Art

In a CD type disk such as a C,D-DA disk for exclusive audio use, or a CD-ROM disk for exclusive use as a read-only memory for digital information, as is well known, main data such as audio data and computer data is recorded along with error correcting codes. A CD type disk player for playing the disk is provided with decoding means to decode the main data for correcting the error of the main data, and a memory to rearrange the data subjected to the decoding.

The conventional decoding means operates in accordance with a reference clock delivered from a reference oscillator comprising a crystal resonator.

From the digital signal read from the disk, a bit clock is regenerated synchronously with each bit of the digital signal. The write operation for the memory is synchronized with the bit clock while the read operation for the memory is synchronized with the reference clock. Accordingly, the jitter of the main data is absorbed in the memory. However, the memory is also used for the encoding, so that the jitter margin cannot be made sufficiently large enough within the memory. As a result, a response of the rotation servo system should be set at a level which enables the disk to revolve within the rated velocity in order to hold the data within the jitter margin.

A CD-ROM disk player for playing a CD-ROM disk has recently been developed to read data from the disk at a speed higher than the rated velocity, for example at a speed twice the rated velocity, so as to enhance the data transmission rate. In such a CD-ROM disk player, it is necessary to remarkably enhance the response of the rotation servo system compared with the rated velocity. The enhancement of the response leads to an enhancement of accelerating and decelerating control of the disk in response to the displacement of the trace of the pickup required for search, thereby achieving a high speed search. This condition causes a demand for a high torque motor as a disk motor in order to improve the drive characteristic of the disk motor.

However, the high torque disk motor results in not only enlargement and higher cost but also a disadvantage with respect to the electric power consumption.

In addition, in a CD-ROM disk player with a high speed reproduction, as described above, the high speed search is indispensable. Upon the high speed search, the encoding of the data has to be delayed until the rotation servo falls within the jitter margin. This has the effect of hindering the improvement of the search speed.

It should be noted that a CD-ROM disk player includes a signal processing circuit for CD-ROM signals, in addition to the decoding means, to conduct digital signal processing such as the further error correction. The signal processing circuit for CD-ROM signals normally operates in accordance with the reference clock generated in the crystal oscillator because the jitter components in the main data are already absorbed in the decoding means. A RAM is also attached to the signal processing circuit for CD-ROM signals for rearranging the data. Naturally, the read and write of the data from and into the RAM are synchronized with the reference clock.

SUMMARY OF THE INVENTION

The object of the present invention is to provide a disk player capable of reproducing the main data recorded in the CD-ROM disk at a high speed.

According to a first aspect of the present invention, there is proposed a disk player for playing a CD type disk, comprising: a clock regenerator for regenerating from a digital signal read from the disk a bit clock synchronized with each bit of the digital signal; and decoding means for decoding main data in the digital signal in accordance with the regenerated bit clock.

With the above configuration, the allowable range of the deviation in the rotation velocity of the disk upon decoding can be enlarged, so that it is not necessary to improve the precision in the servo control of the disk motor. As a result, it is possible to avoid the enlargement in the size and increase in power consumption of the disk motor and to easily accomplish the improvement in the speed of reading out the information from the disk.

According to a second aspect of the present invention, there is proposed a disk player for playing a CD type disk, comprising: decoding means for decoding main data in a digital signal read from the disk; a clock regenerator for regenerating from the disk a bit clock signal synchronized with each bit of the digital signal; a reference oscillator using a crystal resonator for generating a reference clock of crystal oscillation precision; and a selector for selectively supplying the bit clock from said clock regenerator or the reference clock from said reference oscillator to said decoding means, wherein said decoding means decodes based on a selected clock comprising said bit clock or reference clock.

With the above configuration, the operation of the decoding means is synchronized with the reference clock during playing of the CD-DA disk, thereby absorbing the Jitter components due to the deviation in the rotational velocity of the disk. The operation of the decoding means is synchronized with the bit clock during playing of the CD-ROM disk. The latter operation suppresses the effect of the deviation in the rotation velocity of the disk on the decoding, thereby enabling the improved speed of reading out the information from the disk.

If the decoding means is provided with a memory for rearranging the main data, and if the write and read of the main data into and from said memory are synchronized with the bit clock, the write and read of the memory can be completely synchronized with each other, so that the overflow of the data and the empty memory condition can be avoided. Hence, it is possible to suppress the effect of the deviation in the rotation velocity of the disk on the storage of the data into the memory during encoding.

Further, if the disk player further includes switch control means for automatically switching over the selector in response to an identification signal specifying whether the disk to be played is a CD-DA or CD-ROM disk, the disk player automatically Judges by itself which disk, namely a CD-DA or CD-ROM disk, is intended to be played. The operating clock can be selected rapidly and reliably in correspondence with the kinds of disk to be played.

Further, if a signal processing circuit for a CD-ROM signal is connected to the decoding means for further processing the main data which is obtained from the CD-ROM disk and decoded in the decoding means, and if the signal processing circuit operates in accordance with the bit clock, the input and output of the main data into and from the signal processing circuit can be synchronized with each other. Thus, the signal processing in the signal processing circuit cannot be delayed.

Further, if the signal processing circuit is provided with a second memory for rearranging the main data, and if the read and write of the main data from and into the second memory are both synchronized with the bit clock, the signal processing in the signal processing circuit cannot be delayed.

Further, if a signal processing circuit for a CD-ROM signal is connected to the decoding means for further processing the main data which is obtained from the CD-ROM disk and decoded in the decoding means, and if the signal processing circuit operates in accordance with the reference clock, the jitter components of the main data can be absorbed in the signal processing circuit.

Further, if the signal processing circuit is provided with a second memory for rearranging the main data, and if the write of the main data into the second memory is synchronized with the bit clock while the read of the data from the second memory is synchronized with the reference clock, the jitter components of the main data can be absorbed in the signal processing circuit.

BRIEF DESCRIPTION OF THE DRAWING

Further objects and advantages of the invention can be more fully understood from the following detailed description taken in conjunction with the accompanying drawing in which.

DESCRIPTION OF THE PREFERRED EMBODIMENTS

Figure 1:
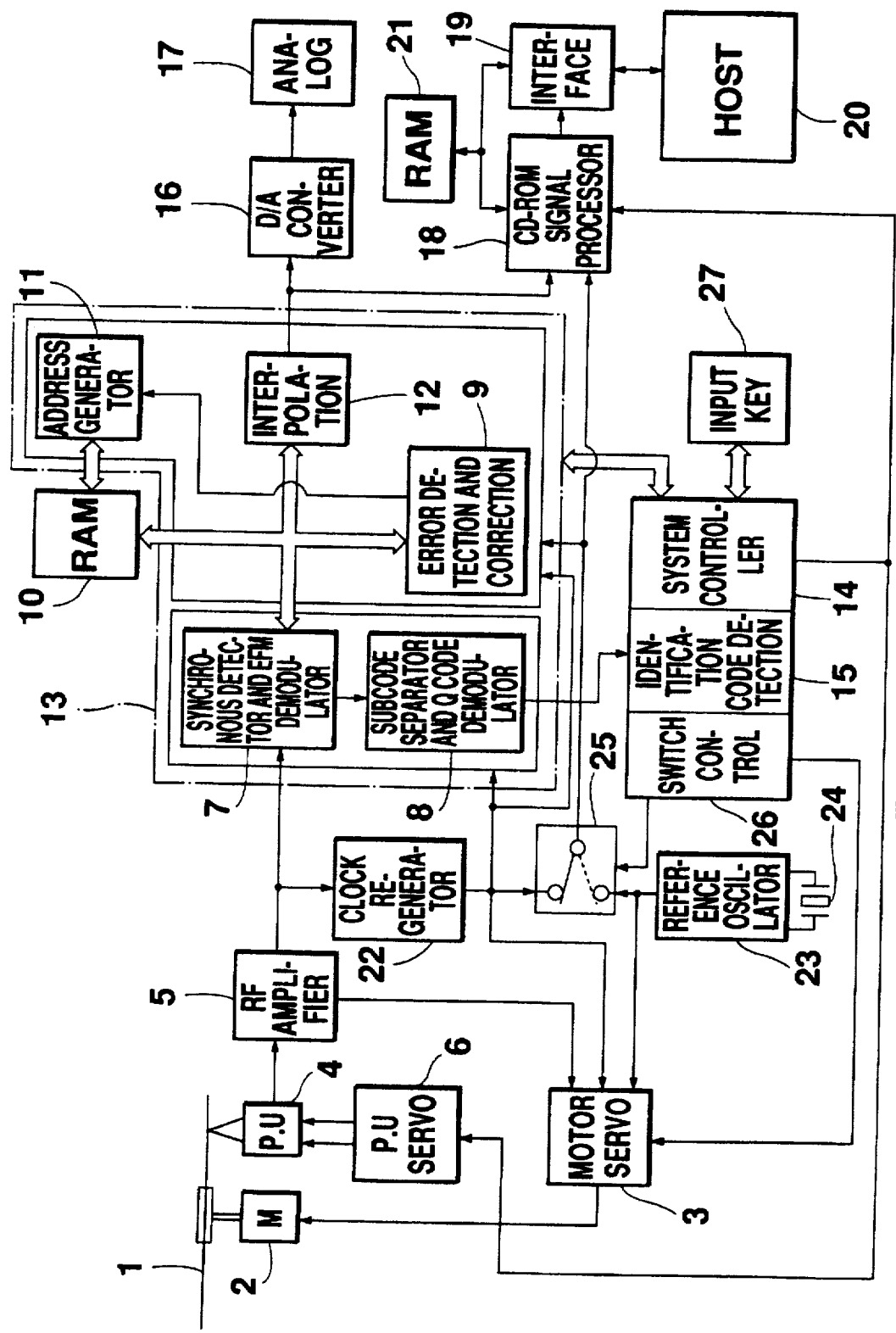
FIG. 1 is a circuit block diagram showing one embodiment of the invention.

Referring now to the accompanying drawing, there is shown a preferred embodiment of the invention.

In FIG. 1, a CD type disk player which reproduces main data recorded on a disk comprises a disk motor 2 for driving a disk I for rotation, a pickup 4 for reading signals from the disk I by tracing the rotating disk 1 with a light beam, and an RF amplifier 5 for amplifying RF high frequency signals of the signals read by the pickup 4 and shaping waveforms thereof. A motor servo circuit 3 controls the disk motor 2 so as to maintain the constant linear velocity of the compact disk 1. A pickup servo circuit 6 controls the pickup 4 to drive in response to an RF signal output from the RF amplifier 5. The pickup servo circuit 6 controls the feeding of the pickup 4 in the diametric direction of the disk 1 while performing focusing control, for focusing a light beam tracing the disk 1 on a signal side of the disk, and tracking control for causing the light beam to trace a signal track.

A digital signal processor 13 is connected to the RF amplifier 5 so as to perform reproduction processing of a digital signal output from the RF amplifier 5. The digital signal processor 13 has a demodulation section for demodulating a digital signal from the RF amplifier 5 and a decoding section for decoding main data obtained from the demodulated digital signal. The demodulation section comprises a synchronous detector and EFM demodulator 7 for detecting a frame synchronization signal indicating the top of a frame from EFM modulated record signals on the disk 1 and performing EFM demodulation of the signals and a subcode separator and Q code demodulator 8 for separating a subcode signal from the digital data demodulated by the synchronous detector and EFM demodulator 7 and demodulating Q code contained in the subcode signal. The decoding section comprises an error detection and correction circuit 9 for decoding the main data provided via the synchronous detector and EFM demodulator 7 and detecting an error in the main data and correcting the error, a RAM 10 used to rearrange digital data after decoding using the error detection and correction circuit 9, an address generator 11 for generating a write address for controlling the write timing of data into the RAM 10 and a read address for controlling the read timing of data from the RAM 10, and an interpolation circuit 12 for interpolating the main data whose error cannot be corrected by the error detection and correction circuit 9 by referencing the main data obtained before and after that erroneous main data.

A system controller 14 comprising a microcomputer performs basic operation control of pickup servo control and motor servo control and also controls indicators (not shown), etc. Basic programs such as a disk playing method, search methods, and a focusing introduction method of the pickup 4 are written into the system controller 14. The system controller 14 comprises identification code detection means 15 for detecting an identification code contained in the Q code demodulated by the subcode separator and Q code demodulator 8 and switch control means 26 for switching the selection state of a selector 25 described below. If the data being reproduced is CD-DA data, the identification code detection means 15 detects the identification code indicating it, such as "x0xx" (where x is 0 or 1), and instructs the switch control means 26 to select a reference clock in response to the detected signal. If the data being reproduced is CD-ROM data, the identification code detection means 15 detects the identification code indicating it, such as "01x0" (where x is 0 or 1), and instructs the switch control means 26 to select a reference clock in response to the detected signal.

An analog circuit 17 for outputting main data (CD-DA data) read from a CD-DA disk is connected to the digital signal processor 13 via a D/A converter 16. The analog circuit 17 removes unnecessary components of analog signals into which digital signals are converted by the D/A converter and outputs main data.

A CD-ROM signal processor 18 for further applying digital signal processing to main data (CD-ROM data) read from a CD-ROM disk is connected to the digital signal processor 13. The CD-ROM signal processor 18 again applies corresponding digital signal processing to CD-ROM data subjected to digital signal processing in the digital signal processor 13 for synchronous detection and also detects and corrects errors in the CD-ROM data. An interface 19 is connected to the CD-ROM signal processor 18 for matching with a host 20 such as an external computer and sending CD-ROM data in response to a request from the host 20. A CD-ROM data RAM 21 is connected to both the interface 19 and the CD-ROM signal processor 18 for rearranging CD-ROM data when an error is detected and corrected by the CD-ROM signal processor 18 and storing CD-ROM data transferred to the host A clock regenerator 22 comprising a PLL circuit regenerates from a digital signal output from the RF amplifier 5 a bit clock synchronized with each bit of the digital signal, and outputs the regenerated bit clock to the selector 25. A reference oscillator 23 uses a crystal resonator 24 to generate a reference clock of crystal oscillation precision, and outputs the generated reference clock to the selector 25. The selector 25 selects either the input bit clock or reference clock and supplies the selected clock to the error detection and correction circuit 9 in the digital signal processor 13 and the CD-ROM signal processor 18 as an operation clock. The switch control means 26 in the system controller 14 controls based on modes set by an input key 27, the switching of disk modes for the selector 25 in response to setting modes entered by an operator through a disk selection key (not shown) and a detection output from the identification code detection means 15. The input key 27 is used to select either automatic selection or manual selection.

Next, the operation of the invention is described.

When the disk 1 is traced by a light beam transmitted from the pickup 4, a signal recorded on the disk 1 is read through the pickup 4 and supplied to the RF amplifier 5 as an RF signal or high frequency signal. The RF signal is amplified and its waveform is shaped by the RF amplifier 5 and the resultant signal is supplied to the digital signal processor 13 as an EFM digital signal.

The digital signal provided through the RF amplifier 5 is supplied to the motor servo circuit 3 together with a bit clock regenerated by the clock regenerator 22 and a reference clock output from the reference oscillator 23. The motor servo circuit 3 detects the pulse width of the shortest pulse in the digital signal and controls the rotational speed of the disk motor 2 so that the pulse width becomes a predetermined length, and furthermore compares phases of signals provided by dividing the regenerated clock and the reference clock for applying phase servo to the disk motor 2, thereby driving the disk 1 for rotation at a constant linear velocity relative to the pickup 4.

The digital signal processor 13 applies EFM demodulation to the input digital signal and extracts and decodes data. At the same time, it detects and corrects an error in main data (CD-DA data or CD-ROM data) and performs interpolation for missing main data. The digital signal processor 13 also separates a subcode signal and demodulates a Q code contained in the subcode signal. The demodulated Q code is supplied to the system controller 14, which then operates in accordance with the Q code.

If the main data output from the digital signal processor 13 is CD-DA data, the main data is converted into an analog signal by the D/A converter 16 and is separated into left and right channel components of stereo. Then, unnecessary components are removed by the analog circuit 17 and the resultant signal is adjusted to a proper signal level for output as an audio signal.

If the main data output from the digital signal processor 13 is CD-ROM data, the CD-ROM signal processor 18 performs digital signal processing corresponding to the CD-ROM data for the main data, makes synchronous detection, and detects and corrects any errors in the main data. Then, the resultant signal is matched with the host 20 through the interface 19 and transferred to the host 20 as computer data in response to a request from the host 20.

The clock regenerator 22 regenerates a bit clock from a digital signal output from the RF amplifier 5. The bit clock is input to the synchronous detector and EFM demodulator 7 and the subcode separator and Q code demodulator 8 in the digital signal processor 13 as an operation clock. Therefore, the synchronous detector and EFM demodulator 7 and the subcode separator and Q code demodulator 8 operate based on the bit clock.

A reference clock from the reference oscillator 23 is input to selector 25 together with the bit clock. The reference clock or bit clock selected at the selector 25 is used as an operation clock for the error detection and correction circuit 9, the address generator 11, and the interpolation circuit 12 in the digital signal processor 139 and for the CD-ROM signal processor 18.

Here, assume that an operator sets the input key to the manual mode.

When the operator sets the disk selection key to the CD-DA disk mode, a reference clock is supplied from the selector 25 to the error detection and correction circuit 9, the address generator 11, and the interpolation circuit 12 in the digital signal processor 13. Therefore, a write address generated by the address generator 11 is output synchronously with a bit clock and the read address is output synchronously with the reference clock. A jitter component produced due to rotation speed deviation of the compact disk 1 as with a normal disk player is absorbed by the RAM 10.

On the other hand, if the operator sets the disk selection key to the CD-ROM disk mode, a bit clock is supplied from the selector 25 to the error detection and correction circuit 9, the address generator 11, and the interpolation circuit 12 in the digital signal processor 13, and the CD-ROM signal processor 18. That is, all circuit components making up the digital processor 13 operate based on the bit clock. In this case, the address generator 11 generates both a write address and read address synchronously with the bit clock. Although the main data containing the jitter component produced due to the rotational speed deviation of the disk 1 is output from the digital signal processor 13, the write timing of data into the RAM 10 and the read timing of data from the RAM 10 are completely synchronized with each other. Therefore, the RAM 10 is prevented from overflowing or becoming empty and data storage in the RAM 10 required for decoding can be performed without receiving any adverse effects produced due to the rotational speed deviation of the disk 1.

Next, assume that the operator sets the input key 27 to the automatic mode. The switch control means 26 switches the selection mode of the selector 25 in response to a detection output of the identification code detection means 15. Therefore, when the identification code detection means 15 detects an identification signal of a CD-DA disk, the circuit components for decoding the main data after EFM demodulation in the digital signal processor 13 operate synchronously with the reference clock in the same manner as when the CD-DA disk mode had been selected manually. On the other hand, when the identification code detection means 15 detects an identification signal of a CD-ROM disk, the circuit components for decoding the main data after EFM demodulation in the digital signal processor 13 operate synchronously with the bit clock in the same manner as when the CD-ROM disk mode had been selected manually. Thus, the compact disk player can automatically judge whether a CD-DA or CD-ROM disk is to be played, and rapidly and securely select the operation clock based on the disk to be played.

Incidentally, in playing a CD-ROM disk, CD-ROM data output from the digital signal processor 13 is supplied to the CD-ROM signal processor 18. The operation clock of the CD-ROM signal processor 18 is changed between reference and bit clocks by the function of the selector 25. Therefore, decoding in the CD-ROM signal processor 18 is also performed synchronously with the bit clock and the output timing of CD-ROM data from the digital signal processor 13 is synchronized with the input timing of CD-ROM data to the CD-ROM signal processor 18, thereby enabling the decoding in the CD-ROM signal processor 18 to be smooth.

The main data decoded in the CD-ROM signal processor 18 is delivered to the host 20 through the interface 19, and is temporarily stored in a memory (not shown) in the host 20 before being processed in the host 20. Therefore, if the main data transferred to the host 20 contains some jitter component, it can still be accepted. Since CD-ROM data subjected to signal processing in the CD-ROM signal processor 18 is temporarily stored in the RAM 21, if data is read from the RAM 21 synchronously with the reference clock, the jitter component can also be absorbed by means of the RAM 21.

Thus, if the circuit components for decoding the main data after EFM demodulation in the digital signal processor 13 are operated synchronously with the bit clock, reproduction is not adversely affected even if rotational speed of the disk 1 fluctuates in the range in which the RAM 10 does not overflow or become empty. For example, just after a track jump is made to execute a search or the like, if the actual speed of revolutions of the disk 1 deviates from the speed of revolutions set for the trace position of the pickup 4, the reproduction of data from the disk can be achieved even during motor servo control for canceling the deviation. Resultantly, when the playing or reproduction speed of a CD-ROM disk is raised to twice or four times the rated velocity, insufficient torque of the disk motor 2 and a low response property of the rotation servo system will not hinder signal reproduction from being executed before completion of rotational speed control involved in the search because the allowable range of the rotational speed deviation of the disk upon reproduction is drastically enlarged. Specifically, the enlarged allowable range supplements the low response property of the rotation servo system, thereby accomplishing a high-speed search corresponding to high-speed reproduction.

If the main data is decoded synchronously with the bit clock, the rotation of the disk need not be kept accurately at a constant linear velocity and the rotation of the disk can be controlled roughly in the enlarged allowable range, thereby enabling power consumption to be reduced.

When a high-speed search is not required even if a CD-ROM disk is played, the disk selection key may be set at the CD-DA disk mode after the input key 27 is set at the manual mode, so that the circuit components for decoding the main data after EFM demodulation in the digital signal processor 13 and the CD-ROM signal processor 18 operate synchronously with the reference clock. Therefore, as with a normal compact player, CD-ROM data free of a jitter component is supplied to the host 20.

What is claimed is:

1. A signal processing circuit for an optical disk player, said signal processing circuit comprising:
   a clock regenerator for regenerating from a digital signal read from a disk a regenerated bit clock synchronized with each bit of the digital signal;
   a demodulating circuit for demodulating the digital signal in accordance with the regenerated bit clock;
   a decoding circuit for decoding main data in the digital signal in accordance with the regenerated bit clock, the decoding circuit including a first memory for rearranging the main data, the decoding circuit further including an error detection and correction circuit for detecting and correcting main data in accordance with the regenerated bit clock;
   a second memory for further processing the main data decoded in the decoding circuit, the second memory being different from the first memory,
   a CD-ROM signal processing circuit for a CD-ROM disk, said CD-ROM signal processing circuit being connected to the decoding circuit for further processing the main data decoded in the decoding circuit,
   wherein both the writing and reading of the main data into and from said first memory are synchronized with the regenerated bit clock, and
   said CD-ROM signal processing circuit includes the second memory, and the writing of the main data into the second memory is synchronized with the regenerated bit clock while the reading of the main data from the second memory is synchronized with a reference clock delivered from a reference oscillator.

2. A signal processing circuit for an optical disk player, the signal processing circuit comprising:
   a clock regenerator for regenerating from the digital signal read from a disk a regenerated bit clock synchronized with each bit of the digital signal;
   a reference oscillator using a crystal resonator for generating a reference clock of crystal oscillation precision;
   a demodulating circuit for demodulating the digital signal read from the disk in accordance with the regenerated bit clock;
   a decoding circuit for decoding main data in the digital signal read from the disk, wherein said decoding circuit includes a first memory for rearranging the main data;
   a second memory for further processing the main data decoded in the decoding circuit, the second memory being different from the first memory;
   a selector for selectively supplying a clock signal to the decoding circuit, said clock signal being either the regenerated bit clock from the clock regenerator or the reference clock from the reference oscillator;
   an identification signal determination circuit for determining whether the disk to be played is a CD-DA or CD-ROM disk in accordance with an identification signal; and
   a control circuit for automatically switching the selector in response to the determination made by the determination circuit,
   wherein the writing of the main data into said first memory is synchronized with the regenerated bit clock while the reading of the main data from said first memory is synchronized with the clock signal selected by said selector.

3. A signal processing circuit for an optical disk player, said signal processing circuit comprising:
   a decoding circuit for decoding main data in a digital signal read from a disk;
   a clock regenerator for regenerating from the digital signal read from the disk a regenerated bit clock synchronized with each bit of the digital signal;
   a reference oscillator using a crystal resonator for generating a reference clock of crystal oscillation precision;
   a demodulating circuit for demodulating the digital signal read from the disk in accordance with the regenerated bit clock;
   a selector for selectively supplying a clock signal to said decoding circuit, said clock signal being either the regenerated bit clock from said clock regenerator or the reference clock from said reference oscillator; and
   a CD-ROM signal processing circuit for a CD-ROM disk, said CD-ROM signal processing circuit being connected to the decoding circuit for further processing the main data decoded in the decoding circuit, wherein said decoding circuit includes a first memory for rearranging the main data, and the writing of the main data into the first memory is synchronized with the regenerated bit clock while the reading of the main data from the first memory is synchronized with the clock signal supplied by the selector, and said CD-ROM signal processing circuit includes a second memory for rearranging the main data, and both the writing and reading of the main data into and from the second memory are synchronized with the clock signal supplied by the selector.

4. A signal processing circuit for an optical disk player, said signal processing circuit comprising:

a decoding circuit for decoding main data in a digital signal read from a disk;

a clock regenerator for regenerating from the digital signal read from the disk a regenerated bit clock synchronized with each bit of the digital signal;

a reference oscillator using a crystal resonator for generating a reference clock of crystal oscillation precision;

a demodulating circuit for demodulating the digital signal read from the disk in accordance with the regenerated bit clock;

a selector for selectively supplying a clock signal to said decoding circuit, said clock signal being either the regenerated bit clock from said clock regenerator or the reference clock from said reference oscillator; and a CD-ROM signal processing circuit for a CD-ROM disk, said CD-ROM signal processing circuit being connected to the decoding circuit for further processing the main data decoded in the decoding circuit, wherein said decoding circuit includes a first memory for rearranging the main data, and the writing of the main data into the first memory is synchronized with the regenerated bit clock while the reading of the main data from the first memory is synchronized with the clock signal supplied by the selector, and said CD-ROM signal processing circuit includes a second memory for rearranging the main data, and the writing of the main data into the second memory is synchronized with the clock signal supplied by the selector while the reading of the main data from the second memory is synchronized with the reference clock.

5. The signal processing circuit as defined in claim 2, further comprising:

a CD-ROM signal processing circuit for a CD-ROM disk, said CD-ROM signal processing circuit being connected to the decoding circuit for further processing the main data decoded in the decoding circuit, wherein said CD-ROM signal processing circuit includes the second memory, and both the writing and reading of the main data into and from the second memory are synchronized with the clock signal supplied by the selector.

6. The signal processing circuit as defined in claim 3, further comprising:

an identification signal determination circuit for determining whether the disk to be played is a CD-DA or CD-ROM disk in accordance with an identification signal; and a control circuit for automatically switching the selector in response to the determination made by the determination circuit.

7. A signal processing circuit for an optical disk player, said signal processing circuit comprising:

a decoding circuit for decoding main data in a digital signal read from a disk;

a clock regenerator for regenerating from the digital signal read from the disk a bit clock synchronized with each bit of the digital signal;

a reference oscillator using a crystal resonator for generating a reference clock of crystal oscillation precision;

a selector for selectively supplying a clock signal to said decoding circuit, said clock signal being either the bit clock from said clock regenerator or the reference clock from said reference oscillator, wherein said decoding circuit decodes based on the clock signal supplied by the selector; and a CD-ROM signal processing circuit for a CD-ROM disk, said CD-ROM signal processing circuit being connected to the decoding circuit for further processing the main data decoded in the decoding circuit, wherein the CD-ROM signal processing circuit includes a first memory for rearranging the main data, and both the reading and writing of the main data from and into said first memory are synchronized with the clock signal supplied by the selector, and wherein the decoding circuit includes a second memory for rearranging the main data, and the writing of the main data into the second memory is synchronized with the regenerated bit clock while the reading of the main data from the second memory is synchronized with the clock signal supplied by the selector.

8. The signal processing circuit as defined in claim 4, further comprising:

an identification signal determination circuit for determining whether the disk to be played is a CD-DA or CD-ROM disk in accordance with an identification signal; and a control circuit for automatically switching the selector in response to the determination made by the determination circuit.

* * * * *